Sept. 14, 1948.  B. M. HAYMAN  2,449,223
BRAKING DEVICE FOR ELECTRIC MOTORS
Filed Nov. 27, 1945  2 Sheets-Sheet 1
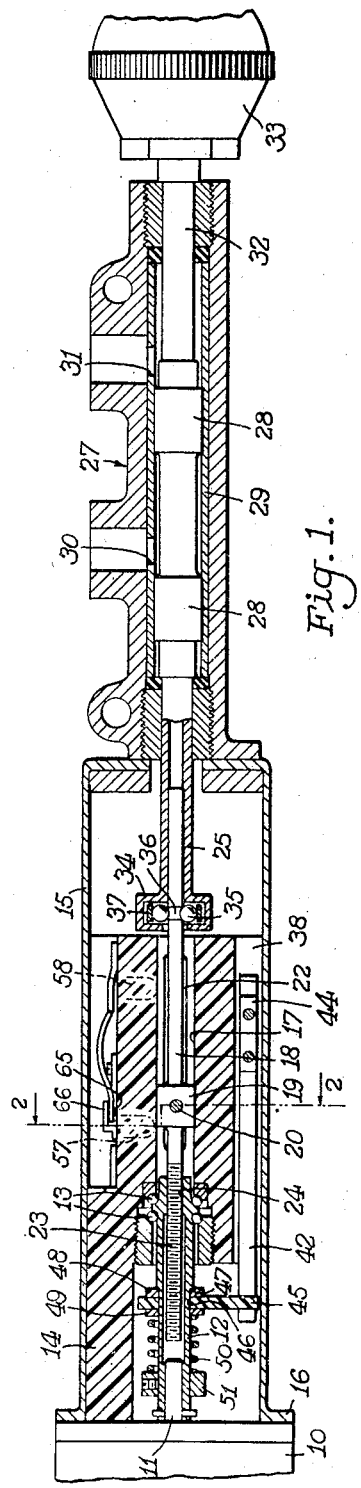
Fig. 1.
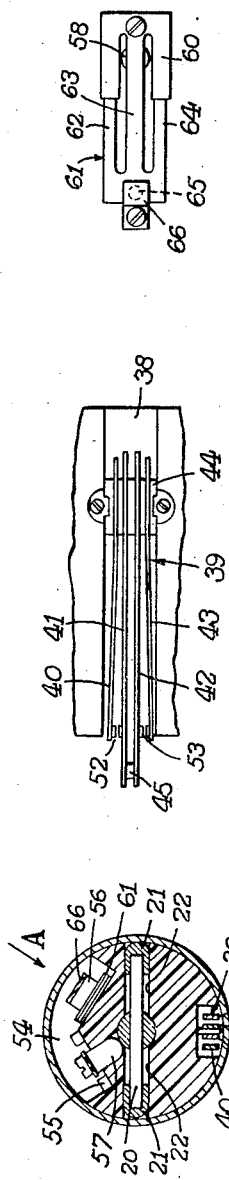
Fig. 4.
Fig. 3.
Fig. 2.
Inventor
Bernard Max Hayman
by Stevens and Davis
his attorneys Sept. 14, 1948.  B. M. HAYMAN  2,449,223
BRAKING DEVICE FOR ELECTRIC MOTORS Filed Nov. 27, 1945  2 Sheets-Sheet 2

Inventor
Bernard Max Hayman
by Stevens and Davis
his attorneys

Patented Sept. 14, 1948

2,449,223

UNITED STATES PATENT OFFICE 2,449,223

BRAKING DEVICE FOR ELECTRIC MOTORS

Bernard Max Hayman, Leamington Spa, England, assignor to Automotive Products Company Limited, Leamington Spa, England Application November 27, 1945, Serial No. 631,157
In Great Britain November 27, 1944

6 Claims. (Cl. 318—275)

This invention relates to braking devices for electric motors, and it has for its object to provide an improved method of and means for bringing a motor to a standstill at a predetermined point in its travel.

In a method of stopping an electric motor at a predetermined position, in which a reverse torque is applied, according to the invention the reversed torque is produced by current controlled by a device which is responsive to the motion of the motor, said motion responsive device being caused to cut off the current producing the reverse torque as soon as the motor is substantially stopped.

There is further provided according to the invention a method of stopping an electric motor at a predetermined position, in which a reverse torque is applied, wherein the reverse torque is produced by current passing through a switch responsive to the motion of the motor, which motion-responsive switch is caused to open by movement of the motor in the reverse direction, thereby cutting off the said reverse torque. Preferably the motion-responsive device or switch is operated by the frictional drag on a member which is pressed against the motor shaft or a member rotated thereby.

As another aspect, the invention provides an electric motor system arranged to be stopped when a predetermined position is reached, said system comprising an electric motor, current control means for applying a reverse torque to said electric motor when the predetermined position is reached, and a motion-responsive switch device which cuts off the current to the motor when the latter starts to turn in the reverse direction under the action of the reverse torque. Conveniently the motion responsive switch is actuated by a member which is operatively connected with the motor shaft by means of a slipping clutch device. If desired the motor may drive a reciprocatory member, the motion-responsive switch being actuated by the rotary movement of the motor, and the current control means for producing reverse torque being actuated by the reciprocatory member as it reaches the end of its stroke. Moreover, the current control means may comprise a limit switch actuated by the motor at a predetermined point in its operation. The motor can rotate a sleeve which latter has an internal thread or equivalent engaging a threaded rod extending within the sleeve, said sleeve carrying externally the member by which the motion responsive switch is actuated. The reciprocatory member may have a projection which, as the reciprocatory member reaches a predetermined position, changes over a two-position switch for applying reverse torque to the motor.

The motor preferably has duplicated field windings connected so that one winding only is used for driving the motor in one direction, and the other winding only is used for the other direction; where the motor is shunt wound, the armature may be connected with the supply through a relay operated by the current in the field circuit.

The motion-responsive switch can conveniently comprise two pairs of contact blades and an angularly movable arm which is mounted upon a rotationally driven member and is connected therewith by a slipping clutch device, the arm being arranged to close contacts carried by one pair of blades during rotation of the motor in one direction, and close contacts on the other pair of blades when the motor rotates in the opposite direction.

The invention is illustrated by way of example in the accompanying drawings, in which—

Figure 1 is a fragmentary sectional elevation of an electric motor driven valve of the piston type;

Figure 2 is a sectional elevation taken on the line 2—2 of Figure 1;

Figure 3 is a fragmentary view of the motion responsive switch as seen from below;

Figure 4 is a plan of one of the reversing switches as seen in the direction of the arrow A in Figure 2;

Figure 6:
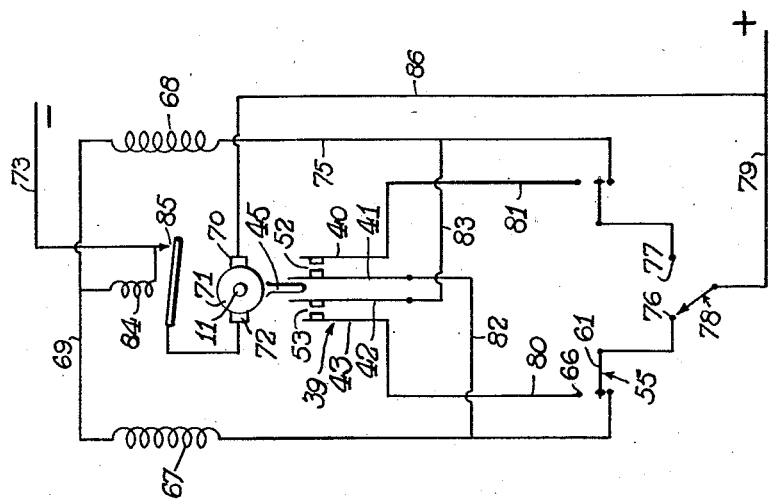
Figure 6 is a corresponding diagram for a shunt wound motor with duplicate field windings.

The device shown in Figure 1 comprises an electric motor 10 having an armature spindle 11 to which is pinned a tubular shaft 12. The right-hand end of the latter is guided in ball thrust bearing 13 mounted in a block 14 which carries the electric switch devices as will be hereinafter described, and is enclosed in a cylindrical casing 15 attached to the motor 10 by a flange 16. This block 14 is drilled axially to form a bore 17 containing a rod 18 having, at about the middle of its length, a cylindrical enlargement 19 which is a smooth sliding fit within the bore 17. A diametral pin 20 (see also Figure 2) extends through the enlargement 19 and has at its ends rollers 21 arranged to run within longitudinal slots 22 in the block 14 so as to prevent rotational movement of the rod 18 without restricting its axial movement. The left-hand part of the rod 18 is screw-threaded as indicated at 23, and is engaged by an internal screw-thread 24 formed within the end part of the sleeve 12, so that the rod 18 is moved to the right or to the left according to the direction in which the spindle 11 of the motor is driven. The right-hand end of the rod 18 extends slidably within a sleeve 25 formed upon the valve member 26 of a piston type valve, indicated generally at 27. As usual, the valve member has enlargements or lands 28 which are a substantially fluid-tight sliding fit within a liner 29 and which act to control the flow of fluid through ports, two of which are seen at 30 and 31. The valve member 26 is also formed with a stem 32 carrying a knob 33 by which the valve can be actuated manually. In order to allow such actuation, the sleeve 25 has an annular housing 34 containing a number of balls 35 which are pressed resiliently into a groove 36 in the rod 18 by means of an encircling spring 37; the grip on the rod afforded by the balls is sufficient to ensure that the valve member 26 is normally driven by the rod 18, although sufficient force can be exerted manually upon the knob 33 to press the balls 35 out of the groove 36, the balls then sliding upon the outside of the rod 18.

The block 14 is formed at its lower part with a longitudinal groove 38 for the accommodation of a motion-responsive switch which is indicated generally at 39. It comprises four spring blades 40, 41, 42 and 43 mounted in a block 44 of insulating material so as to be electrically disconnected from one another. The blades 41 and 42 are longer than the others and extend one on each side of an arm 45 of insulating material. At its upper end this arm has a circular hole 46 within which the tubular shaft 12 extends and is freely rotatable. The shaft itself, however, is formed with an external flat extending from its left-hand end as far as a shoulder 47, and fitting upon this flatted portion is a pair of washers 48 and 49 having appropriate D-shaped holes so as to be non-rotatable on the tubular shaft 12, but slidable therealong. The washers 48 and 49 are disposed on either side of the arm 45 and squeeze the latter resiliently owing to the action of a coiled compression spring 50 bearing at its other end against an adjustable abutment collar 51. The washers 48 and 49 thus tend to turn the arm 45 as one with the tubular shaft 12, but when a predetermined resistance is experienced, the device acts as a frictional slipping clutch. The force transmitted, however, is sufficient to deflect one or other of the spring blades 41, 42, depending upon the direction of rotation, thus making contact, either at 52 between the blades 41 and 40, or at 53 between the blades 42 and 43. When the blade 40 or 43 engages the side of the groove 38 the resistance to further movement exceeds the torque-transmitting power of the clutch device and slipping commences.

At its upper part the block 14 is shaped to form a cavity 54 containing a pair of limit switches 55 and 56 for bringing about reversal of the motor spindle 11. These are actuated by plunger members 57 and 58 which are freely slidable in radial passages in the block 14 and are arranged to be engaged by the enlargement 19 as the latter reaches the corresponding end of its range of travel. The switches 55 and 56 are of the "change-over" type and each is arranged as shown in Figure 4. A bracket 60 attached to the block 14 carries a spring blade 61 having three arms 62, 63 and 64. The outer arms 62 and 64 are arched and the middle arm 63 is arranged to be engaged at a short distance from its anchored end by the corresponding plunger 57 or 58. The blade 61 is shaped so that normally its free end presses resiliently against a lower contact 65 upon the block 14, but when the plunger member 57 or 58 presses upwards, the blade rapidly springs up, leaving the contact 65 and engaging an overhanging bracket 66 forming a second contact.

Figure 5:
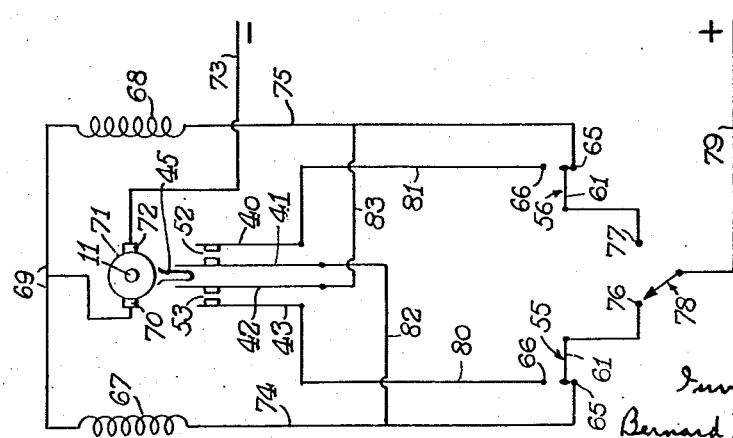
Figure 5 is a connection diagram suitable for a series motor with duplicate field windings.

The electrical connections of the unit are shown in Figure 5. The motor 10 is of the series wound direct current type and has upon its field, magnet duplicate windings arranged to be used alternatively according to the direction of rotation required. These windings are indicated at 67 and 68, and are both connected by a wire 69 to the brush 70 of the commutator, indicated at 71. The other brush 72 is connected by a wire 73 with, say, the negative supply lead. The field windings 67 and 68 are connected at their opposite ends by wires 74 and 75, respectively, to the lower contacts 65 of the plunger-operated limit switches 55 and 56; the blades 61 of these switches are connected to the contacts 76 and 77 of a selector switch 78 used for switching on the motor 10 in the desired direction. This switch is connected to, say, the positive lead 79 of the supply. The contacts 66 of the switches 55 and 56 are connected respectively with the blades 43 and 40 of the motion-responsive switch 39 by wires 80 and 81, while the inner blades 41 and 42 are cross connected to the contacts 65 by wires 82 and 83.

The operation of the unit is as follows. Let it be assumed that the rod 18 and valve member 26 are in the right-hand position or intermediate the ends of their stroke and it is desired to move them to their left-hand position. The selector switch 78 is therefore set to the left-hand position as shown in Figure 5, thus allowing current to flow through the contact 65 of the switch 55 to the field winding 67 and through the commutator 71 to the negative supply lead 73. This turns the motor spindle 11 in a clockwise direction as viewed in Figure 5, so that the frictionally urged arm 45 cause contact to be made at 53, without, however, affecting the current flow as the contact 66 of the switch 55 is isolated. When the rod 18 reaches its left-hand position, the switch 55 changes over to its contact 66 owing to the engagement of the enlargement 19 with the plunger 57, thus breaking the circuit through the field winding 67 and transferring it to the field winding 68 by way of the wire 80, switch blades 43, 42 and the wire 83. This magnetizes the field in the opposite direction so that the momentum possessed by the armature is strongly opposed, the motor thus being brought to a standstill almost instantaneously. At this point in the operation the springiness of the blade 42 (aided perhaps by a very slight reverse torque produced in the motor) urges the arm 45 to its central position, thus breaking the contact at 53 and shutting off the motor entirely, the rod 18 being exactly in the required position. To move the rod 18 to its right-hand position, the selector switch 78 is set to the contact 77, thus energising the field winding 68 and causing the motor spindle 11 to rotate anti-clockwise; the arm 45 therefore closes the contacts at 52, so that when the switch 56 is operated at the end of the stroke, the field winding 67 is energised to produce the reverse torque until the arm 45 resumes its centralised position.

When a motor of the shunt or compound wound type is required, there are two circuits to be switched on and off, and one of said circuits has to be changed over to bring about reverse rotation; for this the general arrangement shown in Figure 6 may be adopted. It is similar to Figure 5, as far as the field windings 67, 68, the motion-responsive switch 39, the limit switches 55, 56 and the selector switch 78 are concerned. The wire 69 joining the upper ends of the field windings, however, is connected through a relay coil 84 to the negative supply lead; this lead is also connected by way of the normally-open relay contacts 85 to the commutator brush 72, the other brush 70 being connected by a wire 86 to the positive supply lead 79. The operation is the same as before and it will be clear that whenever current flows through either field winding 67 or 68, the relay coil 84 is energised, thus closing the contacts 85 and placing the commutator 71 across the supply leads 79 and 73. As soon as the current is switched off from the field windings 67, 68 the relay coil 84 is de-energised and breaks the armature circuit.

It will be understood that the construction and wiring arrangements illustrated are given only by way of example and that various modifications may be made.

Arrangements similar to those described above may be employed with alternating current motors.

The rotation-controlled switch need not be of the particular form described, any arrangement which engages contacts only during rotation of the motor being suitable, and the detail features may be varied in many ways without departing from the scope of the invention.

What I claim is:

1. An electric motor system arranged to drive an actuated member translationally along a path to one end position or the other, according to the position in which a selector switch is set, said system comprising a reversible electric motor having dual windings, one for each direction of rotation, a screw-and-nut drive connecting the motor shaft with the actuated member to produce translational movement, a motion-responsive switch device comprising an arm, a frictional slipping drive from the motor to the arm and a pair of motion-responsive switches which are normally open, one or other of the motion-responsive switches being closed when the motor is rotating, depending upon the direction, a pair of limit switches of the change-over type either one of which is operated mechanically by the actuated member as said actuated member reaches the corresponding end position, each limit switch normally connecting the current supply from the selector switch directly with that motor winding which moves the actuated member towards said limit switch, but when the end position is reached, connecting the supply from the selector switch with the other motor winding by way of one of the motion-responsive switches, so that the motor is brought rapidly to a standstill by reverse torque and the initial reverse rotation cuts off the motor from the supply.

2. An electric motor system according to claim 1 including a sleeve rotatable as one with the motor spindle, a screw thread formed within said sleeve, a screw-threaded stem constituting the actuated member threadedly engaging within the sleeve, and guiding means preventing the stem from rotating but permitting it to move axially as the sleeve rotates.

3. An electric motor system according to claim 1, including a body having a bore within which the actuated member is slidable, plungers fitted slidably within passages in the wall of said bore, a projection on the actuated member to engage the inner ends of the plungers and push one or other of said plungers outwards as the corresponding end position is reached by the actuated member, the limit switches being mounted upon the outside of said body to be operated by the outer ends of the plungers.

4. An electric motor system according to claim 3, in which the body carries the motion-responsive switches, said switches extending within a groove formed in the body substantially parallel with the bore therein, said switches being engaged at right angles by the frictionally driven arm.

5. An electric motor system arranged to drive an actuated member translationally along a path to one end position or the other, according to the position in which a selector switch is set, said system comprising a reversible electric motor having dual windings, one for each direction of rotation, a screw-and-nut drive connecting the motor shaft with the actuated member to produce translational movement, a motion responsive switch device comprising an arm, a frictional slipping drive from the motor to the arm and a pair of motion-responsive switches which are normally open, one or other of the motion-responsive switches being closed when the motor is rotating, depending upon the direction, a pair of limit switches of the change-over type either one of which is operated mechanically by the actuated member as said actuated member reaches the corresponding end position, each limit switch having a snap-over action and normally connecting the current supply from the selector switch directly with that motor winding which moves the actuated member towards said limit switch, but when the end position is reached, connecting the supply from the selector switch with the other motor winding by way of one of the motion-responsive switches, so that the motor is brought rapidly to a standstill by reverse torque and the initial reverse rotation cuts off the motor from the supply.

6. An electric motor system according to claim 5, in which the motor includes an armature fed in parallel with the dual motor windings, a relay energized by current flowing through either one of said motor windings and having its contacts in series with the armature so that when neither of the dual motor windings is passing current the relay breaks the circuit through the motor armature.

BERNARD MAX HAYMAN.

REFERENCES CITED

The following references are of record in the file of this patent:

UNITED STATES PATENTS

| Number | Name | Date |
|---|---|---|
| 1,364,847 | Stratton | Jan. 4, 1921 |
| 1,549,921 | Oberschmidt | Aug. 18, 1925 |
| 1,569,409 | Staege | Jan. 12, 1926 |
| 2,167,850 | Phillips | Aug. 1, 1939 |